United States Patent Office 2,757,860
Patented Aug. 7, 1956

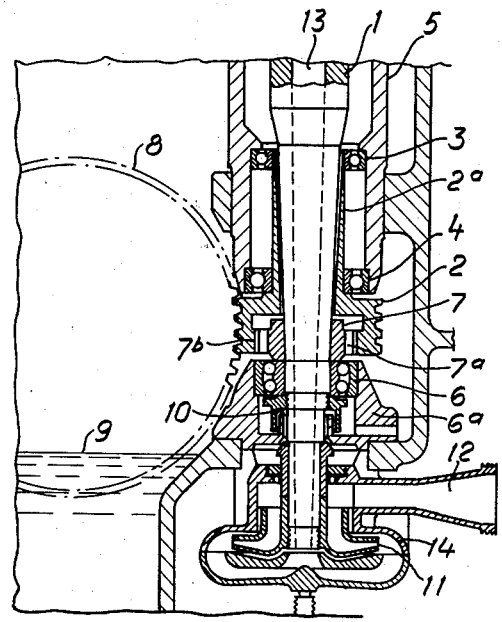

2,757,860

CENTRIFUGAL SEPARATOR DRIVEN THROUGH WORM GEAR

Henric Wilhelm Thylefors, Stockholm, Sweden, assignor to Aktiebolaget Separator, Stockholm, Sweden, a corporation of Sweden Application September 13, 1954, Serial No. 455,488

Claims priority, application Sweden October 1, 1953

5 Claims. (Cl. 233—23)

This invention relates to centrifuges of the type in which the centrifugal bowl is carried by a vertical spindle driven through a worm gear drive, and has particular reference to an improved arrangement for thus driving the spindle while accommodating the usual tilting or swaying movement thereof.

In centrifuges of the type mentioned above, the smaller wheel of the worm gear drive (which may be in the shape of a worm) can be either directly mounted on the bowl spindle or supported in the frame in separate bearings. In the latter case, the bowl spindle is generally arranged to run freely through a bore in the worm wheel and connected to the latter through a coupling, the spindle being supported for swaying or tilting movement in a spherical bearing. The coupling, which is generally arranged between the worm and the spherical bearing, must be so designed that it does not prevent the spindle from tilting freely about the center of the spherical bearing, and it should therefore be a flexible coupling, claw coupling, or the like. The wear and tear of the coupling is increased in proportion to the distance between the coupling and the spherical bearing. Every effort is made to make this distance as small as possible, and the coupling is therefore placed between the spherical bearing and the worm, as previously mentioned. In those centrifuges wherein the spindle of the bowl is provided with a channel for supplying the material to be separated or discharging a separated component, it is customary to equip the lower part of the bowl spindle with an impeller. This impeller should likewise be placed as close as possible to the center of the spindle bearing, because otherwise the clearance between the impeller and its pump housing must be made so large that the efficiency of the pump would be greatly impaired.

The fulfilment of the requirements of a minimum sway of the bowl spindle at the above-mentioned places is rendered more difficult when due consideration is given to the oil level in the gear housing. This level must be high enough so that the lubrication of the worm gear drive will be satisfactory, that is, high enough to submerge the driving worm wheel to a certain depth in the oil. On the other hand, the level of the oil must not be so high that if the centrifuge should be upset or tilted (as on board a ship), the oil will leak out at the place where the spindle protrudes through the frame.

The solving of the present problems is also made more difficult by the fact that the maximum and minimum dimensions of the machine elements involved are dependent upon the power consumption of the machine, the revolutions per minute, etc.

The present invention relates to a centrifuge having a vertical bowl spindle to which the driving motion is transmitted by means of a worm gear drive, one wheel of which surrounds the bowl spindle and is separately supported in bearings located in the frame of the separator, this wheel being connected to the bowl spindle by means of a coupling. The centrifuge of the present invention fulfils all of the above-mentioned requirements in a highly satisfactory manner. This is accomplished primarily by an arrangement in which the wheel surrounding the bowl spindle is supported in bearings located in the separator frame above the wheel. The centrifuge is further characterized by the fact that the coupling is of a form (claw coupling, flexible coupling, or the like) which permits relative movement between this wheel and the spindle to accommodate the usual tilting or swaying movement of the spindle; and this coupling is located in a recessed or hollow part of the wheel, which surrounds the bowl spindle. In this way, the coupling and the spindle bearing can be placed in closely adjacent relation, and at the same time the lower part of the driving worm wheel can be placed so low, in relation to the lower bearing for the bowl spindle, that a sufficiently high oil level can be maintained in the gear housing to ensure satisfactory lubrication of the worm gear drive without risk of the oil leaking out through the latter bearing, as when the centrifuge is used on a ship subject to rolling. The new arrangement also has the advantage that the distance between the lower bearing location for the bowl spindle and an impeller located at the lower end of the spindle will be so small that the maximum radial sway of the impeller in the pump housing will lie within the limits consistent with efficiency of the pump.

The invention will be better understood by reference to the accompanying drawing, in which the single illustration is a vertical sectional view of part of a preferred form of the new centrifuge.

The centrifuging as illustrated comprises a vertical spindle 1 which at its upper portion (not shown) is supported by the usual elastic bearing and carries the separator bowl. The driving motion is transmitted to the bowl spindle 1 by means of a worm gear drive, one wheel 2 of which surrounds the spindle with a clearance and has an upwardly extending sleeve-like projection 2a which similarly surrounds the spindle. By means of two ball bearings 3, 4 engaging the sleeve 2a above the wheel 2, the latter is separately supported in the frame 5 of the centrifuge. The spindle 1 is supported in the frame directly below the wheel 2 by means of a spherical ball bearing 6. The wheel 2 is provided with a recess which receives a coupling sleeve 7 secured to the spindle and provided with outwardly extending claws 7a meshing loosely with inwardly extending claws 7b in the recess of wheel 2. These coacting claws form a coupling which permits the spindle 1 to perform limited oscillations or tilting movements relative to wheel 2, with the spherical ball bearing 6 as a center. Since this bearing is located directly under the wheel 2, both the coupling 7a—7b and the wheel 2 will thus be placed very close to the lower bearing 6 of the spindle. This, in turn, means that the driving wheel 8 of the worm gear drive will be positioned very low so that its lowest point will be well submerged under the oil level 9 in the gear drive housing. In spite of this substantial submergence of wheel 8, there will be a considerable level difference between the oil surface 9 and the location 10 where the spindle protrudes through the frame, whereby the risk of oil leakage through tipping the centrifuge is negligible.

Secured to the lower end of the spindle 1 is an impeller 11 which, through the inlet 12 of the centrifuge, is supplied with the material to be separated. The impeller communicates at its outlet end via its pump housing 14 with a channel 13 located in the spindle and leading to the separator bowl. Thus, the impeller 11 acts to force the feed material into the bowl from the centrifuge inlet 12. The location of the coupling 7a—7b in the worm wheel 2 also has a favorable effect as to the impeller 11. To allow the entrance of the coupling into the worm wheel 2, the diameter of the latter must be made much larger than would normally be the case. This means that the impeller 11 can be placed considerably closer to the bearing 6 than would otherwise be possible, because the increased diameter of wheel 2 results in the worm wheel 3 being spaced farther from spindle 1, whereby a space for the bearing housing 6a surrounding the bearing 6 is formed directly under the worm 2. The shortening of the distance between the bearing 6 and the impeller 11, which is made possible in this manner, is of the greatest importance to the efficiency of the pump, because the clearance required between the hub of the impeller 11 and the pump housing 14 can then be made smaller.

The structure described in the foregoing example can be modified in many ways. For example, in place of the claw coupling 7a—7b between the worm 2 and the spindle 1, any other kind of coupling can be used which permits the swaying or tilting of the spindle around the center of the bearing 6 and can be built into the worm 2.

I clam:

1. In a centrifuge having a frame, a vertical bowl spindle rotatably mounted in the frame for tilting movement relative to the frame, and a worm gear drive for rotating the spindle and including a wheel surrounding the spindle with a radial clearance between said wheel and spindle, the improvement which comprises bearing means mounted in the frame above said wheel and rotatably supporting the wheel separately from the spindle, and a driving coupling connecting said wheel to the spindle and operable to permit relative radial movement between said wheel and spindle to accommodate said tilting.

2. The improvement according to claim 1, in which said wheel is formed with a recess containing the coupling.

3. The improvement according to claim 1, comprising also a bearing rotatably supporting the spindle for tilting movement relative to the frame and located in the frame below said wheel.

4. The improvement according to claim 1, comprising also a bearing rotatably supporting the spindle for tilting movement relative to the frame and located in the frame below said wheel, said wheel having a recess containing the coupling.

5. The improvement according to claim 1, in which said spindle is formed with a feed channel for the material to be centrifuged, and comprising also an impeller mounted on the lower end of the spindle for forcing the material through said channel.

References Cited in the file of this patent

UNITED STATES PATENTS

| 833,088 | Robert | Oct. 9, 1906 |

FOREIGN PATENTS

| 41,932 | Denmark | Mar. 31, 1930 |
| 112,483 | Austria | Mar. 11, 1929 |